(12) United States Patent
Tsai

(10) Patent No.: US 7,496,359 B2
(45) Date of Patent: Feb. 24, 2009

(54) SYSTEM FOR FINDING A MISSING MOBILE PHONE

(75) Inventor: Pei-Ru Tsai, Taipei (TW)

(73) Assignee: Inventec Corporation, Taipei (TW)

( * ) Notice: Subject to any disclaimer, the term of this patent is extended or adjusted under 35 U.S.C. 154(b) by 411 days.

(21) Appl. No.: 11/328,245

(22) Filed: Jan. 10, 2006

(65) Prior Publication Data

US 2007/0159299 A1   Jul. 12, 2007

(51) Int. Cl.
*H04M 3/00* (2006.01)
(52) U.S. Cl. .................. 455/418; 455/419; 455/420; 455/423; 455/425; 455/13.4; 455/414.2
(58) Field of Classification Search .............. 455/417, 455/418, 420
See application file for complete search history.

(56) References Cited

U.S. PATENT DOCUMENTS

| | | | |
|---|---|---|---|
| 5,555,286 A * | 9/1996 | Tendler | 455/404.2 |
| 2006/0028339 A1* | 2/2006 | Ogino et al. | 340/539.32 |
| 2007/0087736 A1* | 4/2007 | Wilson et al. | 455/418 |

* cited by examiner

*Primary Examiner*—Charles N Appiah
*Assistant Examiner*—Randy Peaches
(74) *Attorney, Agent, or Firm*—Bacon & Thomas, PLLC

(57) ABSTRACT

The present invention is to provide a system for enabling a user to know whereabouts of his or her missing mobile phone, which comprises a mobile phone and a remote controller. The mobile phone comprises a control module including a wireless transceiver unit for receiving a wireless search signal transmitted from the remote controller and adapted to convert the received wireless search signal into an instruction for controlling an output unit of the mobile phone consisting of a light emitting unit, a drive unit, an audio unit, and/or a display unit to generate corresponding light, vibration, sound, and/or display characters for alerting the user. The remote controller comprises a button which, when pressed by the user, causes the remote controller to generate the wireless search signal and transmit the same to the mobile phone for executing the corresponding instruction.

7 Claims, 3 Drawing Sheets

SYSTEM FOR FINDING A MISSING MOBILE PHONE

FIELD OF THE INVENTION

The present invention relates to mobile phones and more particularly to a system for enabling a user to know whereabouts of his or her missing mobile phone.

BACKGROUND OF THE INVENTION

Conventionally, a mobile phone comprises control, audio, power, input, output, and wireless receiving circuits. The mobile phone is designed to enable both distant persons having a mobile phone to communicate each other. The circuits are enclosed in a housing as a whole so as to facilitate carrying the mobile phone and using the same. Size of mobile phone is getting smaller and weight thereof is getting lighter as both material science and electronics industry make progress significantly in recent years. Thus, even children or women are able to carry a mobile phone.

However, it is not easy for a user to know whereabouts of a missing mobile phone since size of the mobile phone is getting smaller. It is thus often that a user cannot find his or her mobile phone placed in a location just several tens minutes ago. It is also often that a user forgot whereabouts of his or her mobile phone after placing the mobile phone in a location a relatively long period of time ago. This is because a mobile phone typically does not have a distinct appearance. Further, there is no way for a user to audibly know whereabouts of a missing mobile phone by dialing its number since the mobile phone is typically in an inoperative state. Thus, there is no way for a user to find the missing mobile phone. And in turn, it may cause environmental pollution since there is no way to recycle the mobile phone if it is no more useful. Further, it may bear a great financial burden upon a user since he or she has to buy a new mobile phone. Thus, it is desirable to provide a novel system for enabling a user to know whereabouts of his or her missing mobile phone in order to overcome the inadequacies of the prior art.

SUMMARY OF THE INVENTION

After considerable research and experimentation, a system for finding a missing mobile phone according to the present invention has been devised so as to overcome the above drawbacks of the prior art.

It is an object of the present invention to provide a system for enabling a user to know whereabouts of his or her missing mobile phone. The system comprises a mobile phone and a remote controllerler. The mobile phone comprises a control module including a wireless transceiver unit for receiving a wireless search signal transmitted from the remote controllerler. The control module is adapted to convert the received wireless search signal into an instruction. Thereafter, the control module is adapted to control an output unit of the mobile phone consisting of a light emitting unit, a drive unit, an audio unit, and/or a display unit in response to the instruction. Thus, each component of the output unit may generate corresponding light, vibration, sound, or display characters or icon for alerting the user. Moreover, the remote controllerler comprises a button which, when pressed by the user, causes the remote controllerler to generate a wireless search signal and transmit the same to the mobile phone for receiving.

In one aspect of the present invention for finding a missing mobile phone a user may simply press the button of the remote controllerler to cause the remote controllerler to generate a wireless search signal for the mobile phone receiving. In response, each component of the output unit may generate corresponding light, vibration, sound, or display characters or icon for alerting the user. Therefore, by observing the indication, the user may know whereabouts of his or her missing mobile phone. As a result, the purpose of finding the missing mobile phone is achieved.

In another aspect of the present invention an electric current is still supplied from a power supply of the mobile phone to the control module when the mobile phone has been shut down. Thus, the enabled control module is able to wait to receive the wireless search signal. Therefore, the user still can operate the remote controllerler to cause the mobile phone to generate a corresponding alert even when the mobile phone is in an off state. As an end, by observing the indication, the user may know whereabouts of his or her missing mobile phone.

In yet another aspect of the present invention the remote controllerler has advantages of being simple in construction, inexpensive, easy to copy, and compact. Thus, a manufacturer of the art may assemble both the remote controllerler and the mobile phone in a the same package so as to attract more people to buy it.

The above and other objects, features and advantages of the present invention will become apparent from the following detailed description taken with the accompanying drawings.

DETAILED DESCRIPTION OF THE PREFERRED EMBODIMENTS

Figure 1:
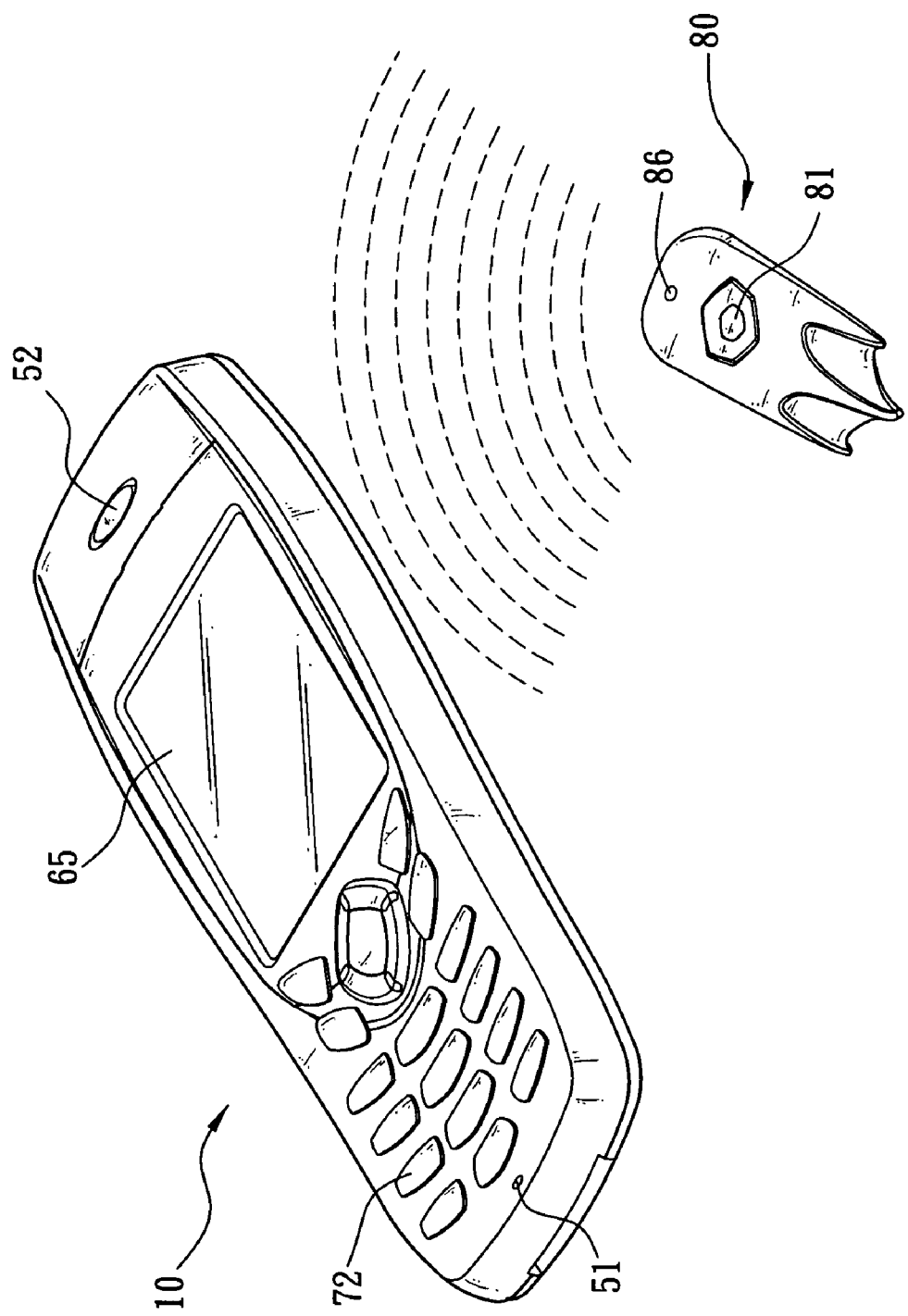
FIG. 1 is a perspective view of a preferred embodiment of system including a mobile phone and a remote controllerler according to the invention.
Figure 2:
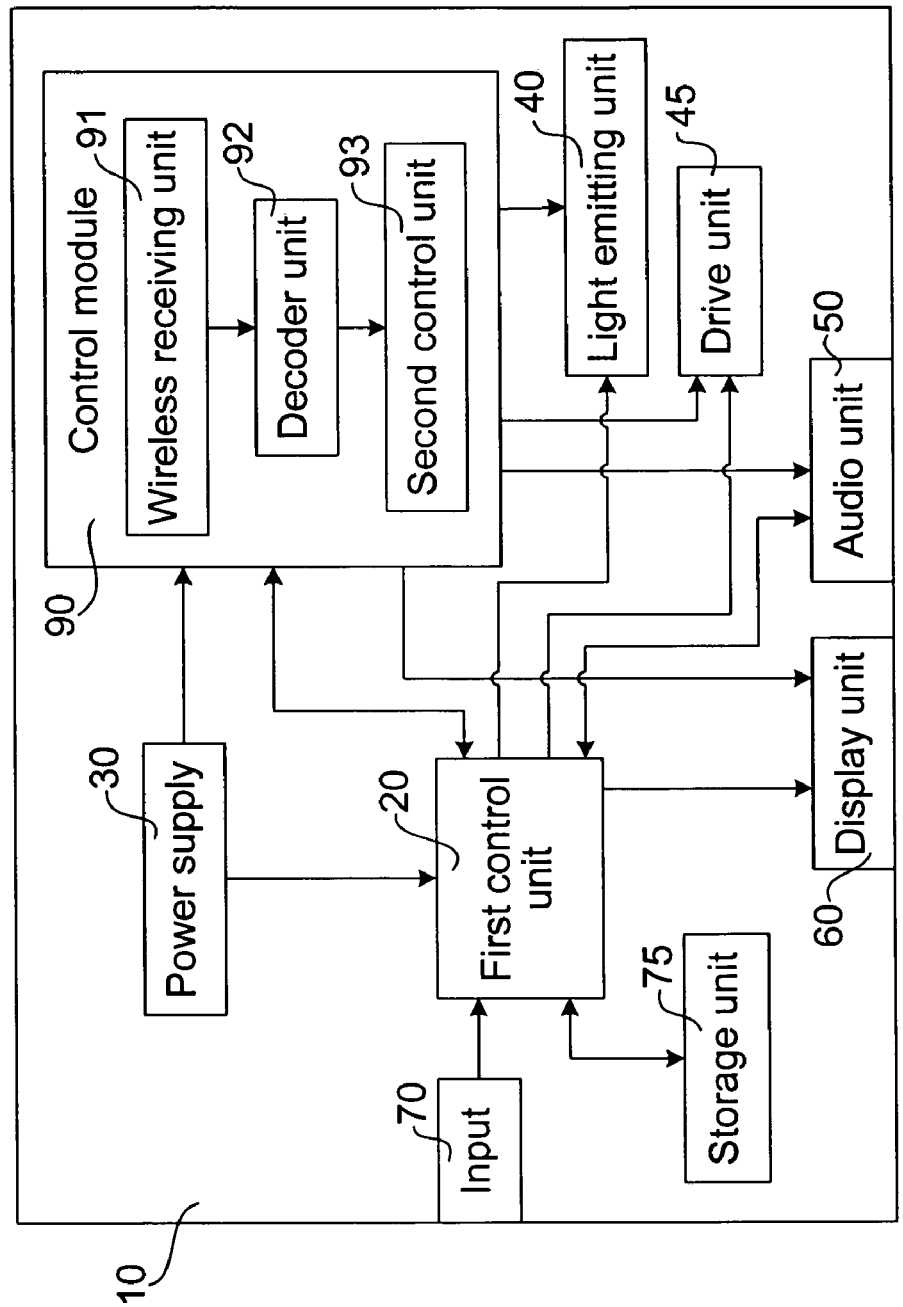
FIG. 2 is a circuit block diagram of the mobile phone.

Referring to FIGS. 1 and 2, a system for finding a missing mobile phone in accordance with a preferred embodiment of the invention comprises a mobile phone 10 and a remote controller 80. The mobile phone 10 comprises a control module 90 for receiving a wireless search signal transmitted from the remote controller 80. The control module 90 may convert the wireless search signal into an instruction after receiving the wireless search signal. Thereafter, the control module 90 may control an output unit of the mobile phone 10 consisting of a light emitting unit 40, a drive unit 45, an audio unit 50, and/or a display unit 60 in response to the instruction. Thus, the light emitting unit 40, the drive unit 45, the audio unit 50, and/or the display unit 60 of the output unit may generate corresponding light, vibration, sound, or display characters or icon for indication. By configuring as above, a user may press one of at least one button 81 of the remote controller 80 when the user wants to know whereabouts of his or her missing mobile phone 10. The remote controller 80 then transmits a wireless search signal to the mobile phone 10 for receiving. The output unit of the mobile phone 10 may generate corresponding light, vibration, sound, or display characters or icon for alerting the user. By observing the indication, the user may know whereabouts of his or her missing mobile phone 10. As a result, the purpose of finding the missing mobile phone 10 is achieved.

Referring to FIGS. 1 and 2 again, the mobile phone 10 further comprises a first control unit 20 electrically connected to each component (e.g., the light emitting unit 40, the drive unit 45, the audio unit 50, and the display unit 60) of the output unit. The first control unit 20 is again electrically connected to an input 70, a storage unit 75, and a power supply 30 respectively. The light emitting unit 40 comprises a plurality of light emitting elements (e.g., LEDs (light emitting diodes)) and is adapted to receive a light emitting instruction from the first control unit 20. Thus, the light emitting unit 40 may generate light in response to the light emitting instruction. The light is then emitted toward the display unit 60 and/or the input 70 such that the mobile phone 10 may be visually lit. The drive unit 45 comprises a vibration motor and is adapted to receive a drive instruction from the first control unit 20. Thus, the drive unit 45 may generate a corresponding physical action in response to the drive instruction. For example, the vibration motor may rotate in vibration and the vibration is adapted to transmit to the phone body of the mobile phone 10. The audio unit 50 comprises a sound receiving member (e.g., microphone) 51 and a sound amplification member (e.g., speaker) 52. The sound receiving member 51 is adapted to receive sound from the external, convert the same into sound input signals, and transmit the sound input signals to the first control unit 20. The sound amplification member 52 is adapted to receive sound input signals from the first control unit 20, convert the same into sound, and amplify sound for output. The display unit 60 comprises a display 65 and is adapted to receive signals from the first control unit 20 and display corresponding alphabets, digits, and graphics on the display 65 in response to the signals. The input 70 comprises a plurality of keys 72. A user may press a key 72 to generate a corresponding signal. The input 70 then transmits the corresponding input signals to the first control unit 20. Thus, the first control unit 20 may decode the input signals into corresponding alphabets, digits, or instructions. The storage unit 75 serves as storage for storing required operating system (e.g., Linux, Windows CE, or the like) for the mobile phone 10, applications (e.g., music playing software, image editing software, word processing software, etc.), and files (e.g., music files, image files, text files, etc.) for the first control unit 20. The power supply 30 is implemented as a rechargeable battery for supplying electric current to the first control unit 20 for its normal operation. Further, the power supply 30 is electrically connected to the control module 90 for supplying electric current thereto for its normal operation.

Note that the supplied electric current is divided into power-on current and power-off current. The power-on current is supplied by the power supply 30 when the mobile phone 10 is power on. The power-on current is a large current supplied to electronic components of the mobile phone 10 for its normal operation. To the contrary, the power-off current is supplied by the power supply 30 when the mobile phone 10 has been shut down. The power-off current is a small current and is supplied to the control module 90.

Referring to FIG. 2 again, the control module 90 comprises a wireless receiving unit 91, a decoder unit 92, and a second control unit 93. The wireless receiving unit 91 is adapted to wirelessly receive a wireless search signal transmitted from the remote controller 80 and send the same to the decoder unit 92. The decoder unit 92 is electrically connected to the second control unit 93. Thus, in response to receiving the wireless search signal, decoding the same, and converting decoded signal into a corresponding search signal, the decoder unit 92 may send the search signal to the second control unit 93. In response to receiving the search signal, the second control unit 93 may generate a corresponding instruction and send the same to the light emitting unit 40, the drive unit 45, the audio unit 50, and/or the display unit 60 as output. As a result, the light emitting unit 40, the drive unit 45, the audio unit 50, and/or the display unit 60 may generate a corresponding indication.

Figure 3:
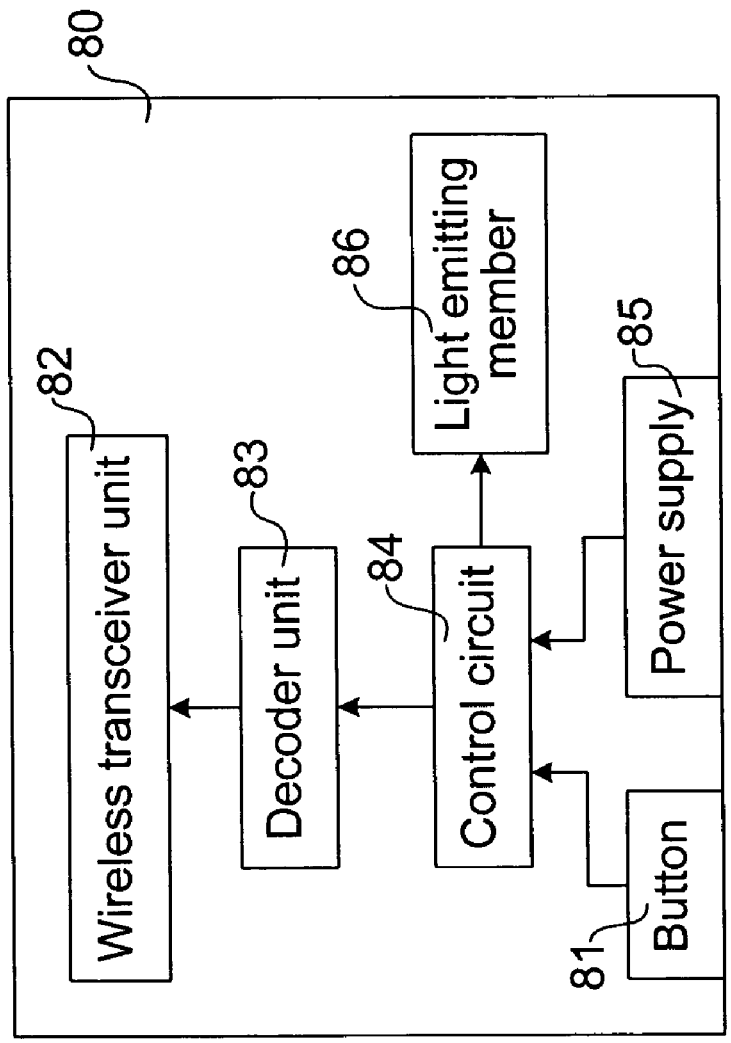
FIG. 3 is a circuit block diagram of the remote controller.

Referring to FIG. 3, the remote controller 80 further comprises a wireless transceiver unit 82, a decoder unit 83, a control circuit 84, and a power supply 85. The control circuit 84 is electrically connected to the button 81, the decoder unit 83, and the power supply 85 respectively. A control signal is generated when the button 81 is pressed. The control signal is then sent to the control circuit 84. After receiving the control signal, the control circuit 84 converts the control signal into a corresponding search signal which is then sent to the decoder unit 83. After receiving the search signal, the decoder unit 83 decodes the search signal and converts the decoded signal into a corresponding wireless search signal. The wireless transceiver unit 82 is electrically connected to the decoder unit 83 so as to receive the wireless search signal from the decoder unit 83 and transmit the same to the air for the mobile phone 10 receiving. The power supply 85 comprises a rechargeable battery for supplying electric current to the control circuit 84 for its normal operation.

Referring to FIG. 3 again, the remote controller 80 further comprises a light emitting member 86 electrically connected to the control circuit 84. In response to pressing the button 81 and a control signal generated by the button 81, the control circuit 84 may generate a search signal and a light emitting signal which is in turn sent to the light emitting member 86. The light emitting member 86 then emits light toward the external in response to receiving the light emitting signal. In brief, a user is aware whether the remote controller 80 operates normally or not by visually observing the lighting condition of the light emitting member 86 in response to pressing the button 81.

Referring to FIG. 2 again, in a preferred embodiment of the invention the second control unit 93 of the control module 90 is electrically connected to the first control unit 20. In response to turning on the mobile phone 10, the first control unit 20 may generate a power-on signal after a predetermined period of time has elapsed. The generated power-on signal is then sent to the second control unit 93. In response to continuing to receive the power-on signal, the second control unit 93 then generates a response signal which is in turn sent to the first control unit 20. Thus, the first control unit 20 may determine whether the control module 90 has received the wireless search signal or not. The second control unit 93 may send the response signal representing not receiving the wireless search signal to the first control unit 20 when the control module 90 does not receive the wireless search signal. At this time, the first control unit 20 has a highest control priority and the second control unit 93 has a lowest control priority. Thus, the first control unit 20 may control the light emitting unit 40, the drive unit 45, the audio unit 50, and/or the display unit 60 in response to the generated light, vibration, sound, and/or display signal. To the contrary, the second control unit 93 may send the response signal representing receiving the wireless search signal to the first control unit 20 when the control module 90 receives the wireless search signal. At this time, the first control unit 20 has a lowest control priority and the second control unit 93 has a highest control priority. Thus, the second control unit 93 may control the light emitting unit 40, the drive unit 45, the audio unit 50, and/or the display unit 60 to generate a corresponding action in response to the generated instruction and power-off current.

Referring to FIG. 2 again, the second control unit 93 has a highest control priority when the second control unit 93 is not capable of receiving a power-on signal generated by the first control unit 20 due to the off mobile phone 10. Moreover, the power supply 30 supplies electric current to the control module 90 for its normal operation. After the second control unit 93 receiving the search signal and converting the same into a corresponding indication, the second control unit 93 may control the light emitting unit 40, the drive unit 45, the audio unit 50, and/or the display unit 60 to generate a corresponding action in response to the generated indication and power-off current.

While the invention herein disclosed has been described by means of specific embodiments, numerous modifications and variations could be made thereto by those skilled in the art without departing from the scope and spirit of the invention set forth in the claims.

What is claimed is:

1. A system for enabling a user to know the whereabouts of his or her missing mobile phone, the system comprising:
    a remote controller, including:
        at least one button adapted to be pressed to generate a control signal;
        a control circuit electrically connected to the button for receiving the control signal and being adapted to generate a search signal in response to the control signal;
        a first decoder electrically connected to the control circuit for receiving the search signal and being adapted to convert the search signal into a wireless search signal;
        a wireless transceiver unit electrically connected to the first decoder for receiving the wireless search signal and transmitting the wireless search signal to an external; and
        a first power supply electrically connected to the control circuit for supplying electric current thereto; and
    a mobile phone, including:
        a first control unit electrically connected to a plurality of output units thereof;
        a control module electrically connected to the first control unit and comprising: a wireless receiving unit adapted to wirelessly receive the wireless search signal generated by the remote controller;
        a second decoder electrically connected to the wireless receiving unit for receiving the wireless search signal and converting the wireless search signal into a search signal; and
        a second control unit electrically connected to the first control unit for receiving a power-on signal generated by the first control unit and generating a signal in response to the received power-on signal, wherein the second control unit is adapted to send a response signal representing the search signal to the first control unit, when the second control unit has received the search signal from the second decoder, so as to enable the second control unit to have a highest control priority than the first control unit for converting the search signal or response signal into a corresponding instruction signal and activating the output units connected thereto to generate a corresponding indication in response to the instruction signal; and
        a second power supply electrically connected to the first control unit and control module for supplying electric current thereto.

2. The system of claim 1, wherein the remote controller further comprises a light emitting member electrically connected to the control circuit, the light emitting member being adapted to emit light in response to a light emitting signal generated by the control circuit.

3. The system of claim 1, wherein the output unit of the mobile phone is a speaker for receiving the instruction signal and generating sound in response to the instruction signal.

4. The system of claim 1, wherein the output unit of the mobile phone is a display for receiving the instruction signal and displaying alphabets, digits, or graphics in response to the instruction signal.

5. The system of claim 1, wherein the output unit of the mobile phone is a light emitting diode (LED) for receiving the instruction signal and emitting light in response to the instruction signal.

6. The system of claim 1, wherein the output unit of the mobile phone is a vibration motor for receiving the instruction signal and rotating in vibration in response to the instruction signal.

7. The system of claim 1, wherein the electric current supplied by the second power supply of the mobile phone is a power-off current, and the power-off current is supplied to the control module for its normal operation when the mobile phone has been shut down.

* * * * *